Aug. 14, 1962 R. P. MALOOF 3,048,927
HEIGHT INDICATING APPARATUS
Filed April 25, 1958 2 Sheets-Sheet 1
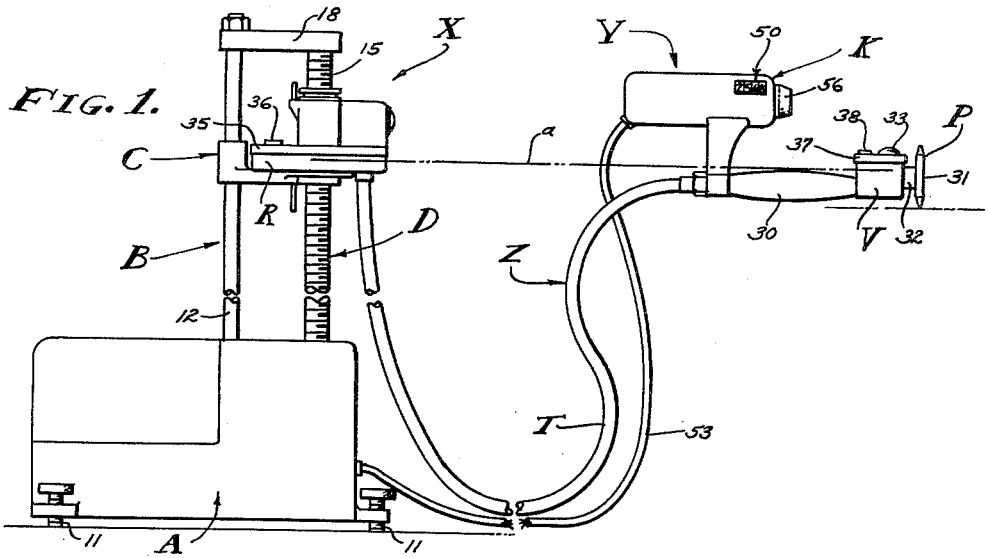
FIG. 1.
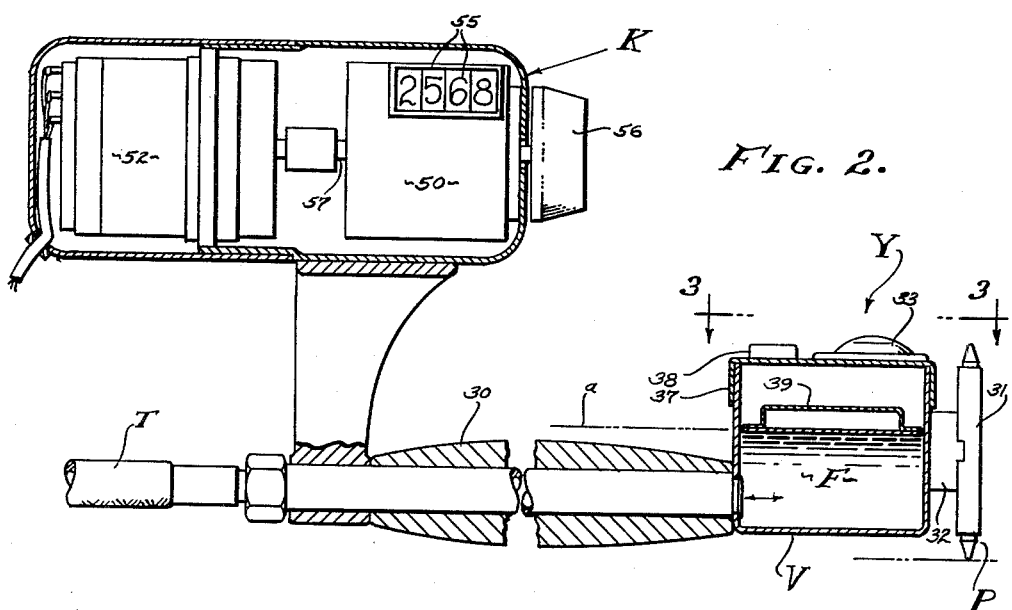
FIG. 2.
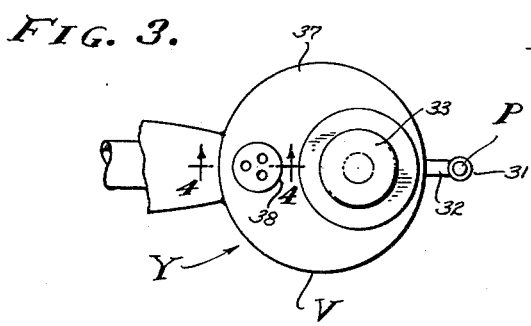
FIG. 3. FIG. 4.
INVENTOR.
RALPH P. MALOOF
BY
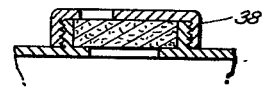
AGENT

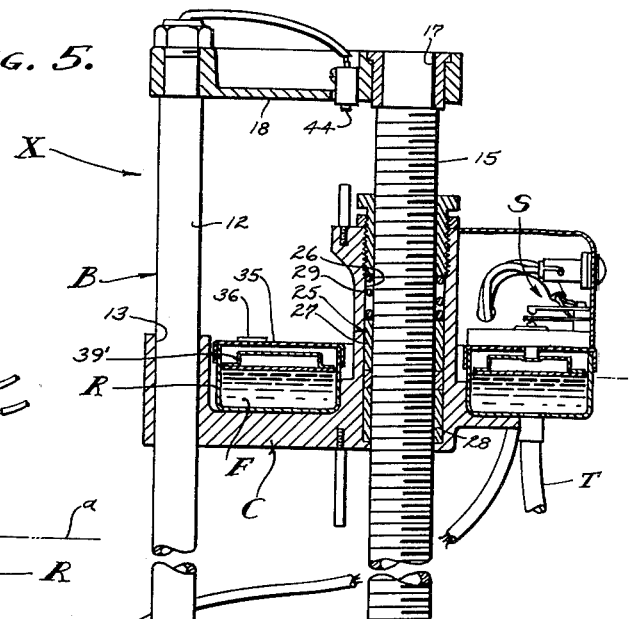
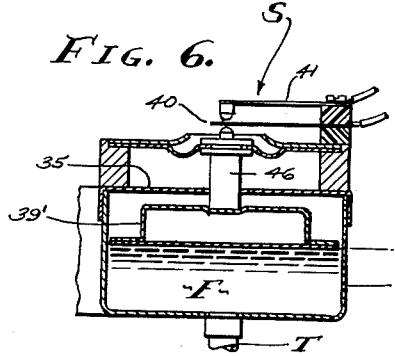
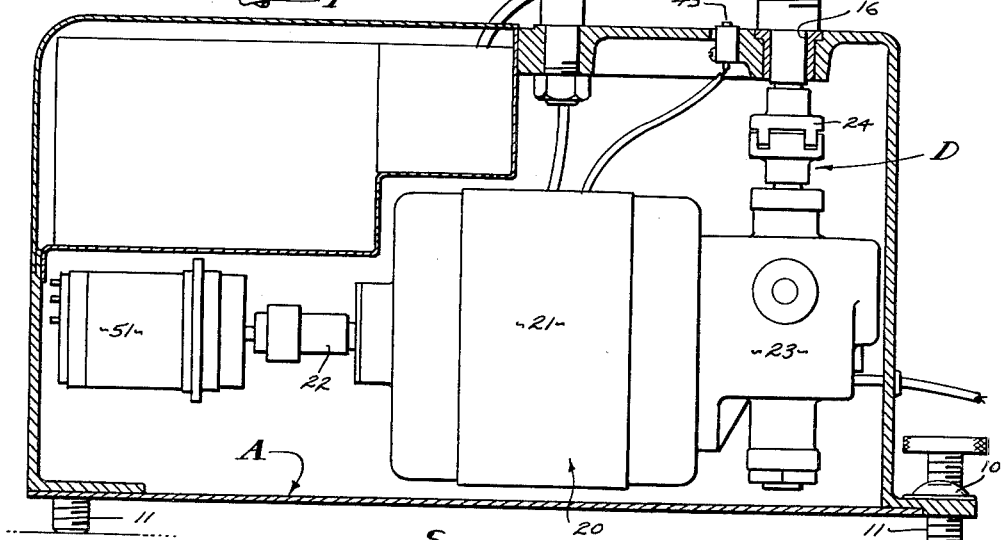
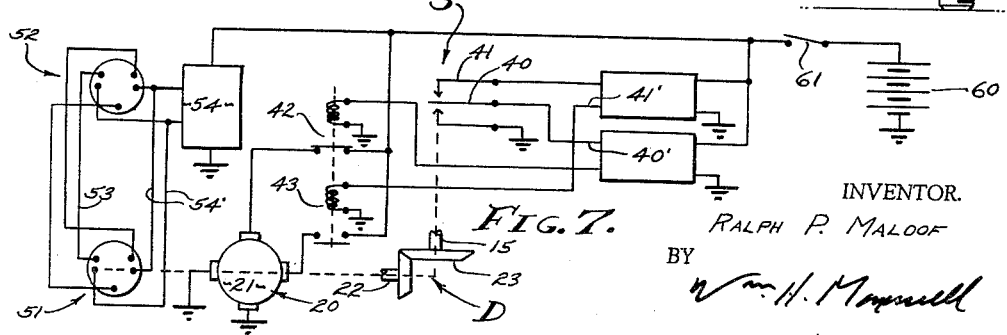

United States Patent Office 3,048,927
Patented Aug. 14, 1962

3,048,927
HEIGHT INDICATING APPARATUS
Ralph P. Maloof, Los Angeles, Calif.
(5847 Country Club Drive, Rialto, Calif.)
Filed Apr. 25, 1958, Ser. No. 731,051
8 Claims. (Cl. 33—209)

This invention relates to a height indicating apparatus and is particularly concerned with a liquid height gage that is electro-mechanically actuated, it being a general object of this invention to provide an instrument that accurately indicates heights relative to a horizontal reference plane.

Machine work of all kinds requires accurate line and point layout techniques, for example, in the manufacture of tools, jigs and fixtures, and in the manufacture of finished products. Many industries require precise means for determining levels and elevations, whether it be in connection with small or large constructions. For instance, height indicating apparatus is necessary in connection with the building of aircraft, ships, highways, bridges and marine installations, etc.

Vertical heights are presently determinable by various means but with limitations. Since exact measurements are required, factors such as temperature, rigidity and stillness must be taken into consideration, and these factors adversely affect instruments of the type under consideration. That is, thermal expansion and contraction causes discrepancies, rigid and cumbersome instruments must be handled with extreme caution and care, and movements, including vibrations and shocks, result in inaccuracy. Further, any one instrument of the type being considered is usually limited in application, being designed for a particular purpose that is limited in range or function, for example, in size and capacity.

An object of this invention is to provide a versatile height indicating apparatus that is operable under a wide variety of conditions. The apparatus or instrument that I provide is equally useful in the measurement of small as well as large objects and is applicable to accessible objects as well as to inaccessible or remote objects.

It is an object of this invention to provide a height indicating apparatus that requires no adjustments in the nature of checking, etc., and which is always available to indicate the height of an object relative to a horizontal reference plane.

It is still another object of this invention to provide a height indicating apparatus wherein the object to be measured may be selectively associated with any desired horizontal reference plane as circumstances require.

It is also an object of this invention to provide a height indicating apparatus wherein the measured height is immediately indicated as a number, or suitable indicia, automatically and without manipulation or manual operation of wheels or controls or the like.

A further object of this invention is to provide a height indicating apparatus that utilizes fluid levels in order to indicate heights and which also utilizes actuating means, preferably electro-mechanical means, that positions elements to the end that a measured height is indicated.

An object of this invention is to provide a height indicating apparatus of the character thus far referred to that involves an operating unit that is transportable and which can be set in operation at any desired and suitable place, and that involves a probe unit that is universally movable and which is of minimum size and bulk.

It is an object of this invention to provide a height indicating apparatus of the character thus far referred to that involves an operating unit and means transmitting forces from the operating unit to an indicator to show the height of said operating unit. The indicator may be associated with the probe unit, or operating unit, or it may be a unit in and of itself, as required.

It is still another object of this invention to provide a height indicating apparatus of the character above referred to that involves an operating unit that automatically follows the positioning of a probe unit. In the structure that I provide the above mentioned electro-mechanical means operates to position the elements of the operating unit in response to positioning of the probe unit, immediately and without delay, and to the end that a height indication is immediately available upon each repositioning of the probe unit.

The various objects and features of my invention will be fully understood from the following detailed description of a typical preferred form and application of my invention, throughout which description reference is made to the accompanying drawings, in which:

FIG. 1 is a general elevational view of the apparatus that I provide for the purpose of measuring heights. FIG. 2 is an enlarged detailed sectional view of a portion of the apparatus shown in FIG. 1. FIG. 3 is a plan view taken as indicated by line 3—3 on FIG. 2. FIG. 4 is a detailed sectional view of a portion of the device and taken as indicated by line 4—4 on FIG. 3. FIG. 5 is an enlarged elevational view of a portion of the apparatus shown in FIG. 1. FIG. 6 is an enlarged detailed view of a portion of the device shown in FIG. 5, and FIG. 7 is a diagrammatic view of the electrical elements that are involved.

The height indicating apparatus is illustrated generally in FIG. 1 of the drawings where it is shown as involving, basically, an operating unit X, a probe unit Y, and a coupler Z joining the units X and Y. The apparatus that I provide may take various forms and configurations and involves, generally, the use or employment of a fluid level in a flexible duct and means for actuating a position indicator K, later described, that displays the relative height of the probe unit Y. The various elements of the structure may or may not be associated as shown; for example, I prefer to associate the counter K with the probe unit Y so that it is carried thereby, it being understood that the counter K can be a separate unit by itself, or associated with the operating unit X. Further, the operating unit X is indicated as being a self-contained unit energized through means of batteries, it being understood that it may be energized from any suitable power source whether electrical, mechanical or fluid energized.

As shown, the operating unit X is a portable structure, involving generally, a base A, a vertically disposed guide B, a vertically shiftable carriage C, and elevating means D. Further, the operating unit X involves portions of the coupler Z and of the position indicator K, all as hereinafter described. Also, the operating unit X houses the power supply and the elements of the particular electrical system disclosed.

As shown, the probe unit Y is a universally shiftable structure adapted to be manually, or otherwise, positioned relative to the object to be measured, and involves, generally, one or more vertically disposed feelers P adapted to engage an object to be measured for height.

As shown, the coupler Z is a flexible fluid-carrying element that extends between the units X and Y and involves, generally, a reservoir R supported by the carriage C of the unit X, a vessel V supported by the unit Y, and an intermediate tube T joining the reservoir R and vessel V so that they are in open communication with each other.

The base A of the operating unit X is preferably a housing element that supports the guide B and elevating means D, and which encloses the power supply and related electrical elements. The base A is adapted to be horizontally disposed and has therefore a leveling indicator, preferably a fluid spirit level 10 (see FIG. 5). In order to level the base A it is supported by vertically adjustable legs 11, for example, three legs 11, which are shown in the form of screw jacks. It will be apparent how the base A can be leveled as circumstances require.

The guide B is a vertically disposed guide and, in the form of invention illustrated, is a column 12 that projects vertically from the base A. The form of the column 12 may vary and, as shown, it may be a simple straight part round in cross section and having a smooth exterior wall.

The carriage C is a vertically shiftable carriage and is slidably engaged with the guide B to be directed vertically by the column 12. In the case illustrated the carriage C has a vertically disposed opening 13 slidably engaged over the column 12 to the end that the carriage is limited to vertical movement, either up or down.

The elevating means D is provided to shift the carriage C vertically, either upwardly or downwardly, as required, and is preferably a mechanical means involving a lead screw 15 rotated by a drive 20 and operating in a nut 25 connected with the carriage C. The screw 15 is a vertically disposed elongate screw rotatably supported in a bearing 16 in the base A and steadied by a bearing 17 carried by an arm 18 supported by the upper terminal end portion of the guide column 12.

The drive 20 for rotating the screw 15 is preferably an electric motor drive involving a prime mover 21 having a drive shaft 22 operating through a gear reduction box 23, to rotate a vertically disposed coupling 24. The coupling 24 is connected with the lower end of the lead screw 15 so that the screw 15 is rotated when the prime mover 21 is operated. In accordance with the invention, the prime mover 21 is a reversible prime mover adapted to drive in either direction by suitable switching as later described.

The nut 25 is carried in an opening 26 that extends vertically through the carriage C and is a threaded device that is driven vertically upwardly or downwardly when the screw 15 is rotated. The lead screw 15 extends through the opening 26 and is threadedly engaged in the nut 25. As indicated, the nut 25 is of the self-adjusting type that involves two relatively shiftable sections 27 and 28. A spring 29 adjustably biases one section against the other, the sections being keyed against rotation in the opening 26.

The probe unit Y is free to be moved manually in any direction and involves, essentially, the feeler P that is engageable with the object to be measured. For convenience of handling, the probe unit Y also involves a handle 30 that projects from and carries the feeler P. The feeler P may vary widely depending upon the object to be engaged, and I have shown a typical feeler P, in fact I have shown two oppositely disposed feelers P on a vertical axis. As illustrated, the two feelers P are a unit of construction having a body 31 keyed to a support 32 at the end of the handle 30. In accordance with the invention, the probe unit Y should be maintained in a horizontal position when a measurement is taken and has therefore a leveling indicator 33, preferably a fluid spirit level 33 (see FIGS. 2 and 3). The probe unit is manually leveled, or otherwise leveled, when a measurement is taken.

The coupler Z, as above described, involves a reservoir R, a vessel V and an intermediate tube T. The reservoir R is supported by the carriage C and is adapted to move vertically with the carriage and is provided to carry a suitable supply of fluid F. The reservoir is closed by a cover 35 and is provided with a breather or vent 36. In the particular case illustrated, the reservoir R is a circular container or vessel that surrounds the lead screw 15. In carrying out the invention, the reservoir R is of substantial area in order to minimize volumetric changes that might, or will, occur as the tube T is handled and moved about. In the particular case illustrated, the tube T is, for example, approximately one thousandth the cross sectional area of the reservoir R, to the end that mechanical deflection of the tube T, that might affect the volume of fluid in the tube, will have a reduced effect upon the fluid level in the reservoir R, in proportion to the ratio of said cross sectional area. Therefore, inaccuracies that would ordinarily be caused by handling of the tube T are reduced to a practical minimum.

The vessel V is supported by the probe unit Y and is adapted to move vertically with said unit, and it is provided to receive fluid F from the reservoir R through the tube T. The vessel V is closed by a cover 37 and is provided with a breather or vent 38. As shown, the vessel V is of substantially small displacement.

The tube T is an open duct that joins the reservoir R and vessel V so that they are in open communication with each other. In practice, the tube T is a flexible hose with a mechanical shield so that its volume is not altered by over-bending and other mechanical strains.

In carrying out the present invention, the fluid F that I prefer to employ is liquid mercury which readily seeks a level and which is adapted to readily float elements for operating the electrical contacts later described. When mercury is employed, chamois is employed in the vents 36 and 38 in order to prevent exit of the said mercury from the system in cases when the units X and Y are displaced from normal vertical alignment. Further, a float 39 occupies the exposed area of the fluid F in the vessel V, while a float 39' occupies the exposed area of the fluid F in the reservoir R. The floats 39 and 39' prevent excess agitation of the fluid F and act to dampen motion of the fluid. Further, the floats 39 and 39' are provided to prevent the formation of amalgams of mercury which could be formed by mixture of said mercury with other materials, if left uncovered and unprotected.

In accordance with the present invention, I provide means S controlling the vertical position of the reservoir R in response to the vertical positioning of the vessel V. It is readily observed from FIG. 1 of the drawings that the level $a$ of fluid F is maintained in both the reserovir R and vessel V. Therefore, raising of the vessel V results in a corresponding rise of fluid F in the reservoir R, or lowering of the vessel V results in a corresponding drop of fluid F in the reservoir R. In any case, vertical shifting of the vessel V causes a change in the fluid level in the reservoir R carried by the carriage C.

The means S for controlling the vertical position of the reservoir R is shown as an electrical means and involves, generally, switch contacts 40 and 41 for raising and lowering the carriage C, respectively, and an operator 46 operatively connected to the float 39' for positioning the contacts 40 and 41 in response to the fluid level in the reservoir R. A counterbalance 46' is positioned at one side of the float 39' in order to dynamically balance the float since the operator 46 projects upwardly from one side of the float. As shown, the counterbalance 46', is placed diametrically opposite the operator 46 and with the result that the float 39' remains level.

When the fluid F is at a sub-normal level in the reservoir R the prime mover 21 is energized through a normally closed relay 42 to drive the lead screw 15 in a direction to lower the carriage C and reservoir R. This actio causes a rise of fluid F in the reservoir R and causes the operator 46 to close the contact 40 which energizes the relay 42 to open the circuit to the prime mover 21, thus stopping movement of the carriage in a position determined by the vertical elevation of the probe unit Y.

When the fluid F is at an above-normal level in the reservoir R the rise of fluid F causes the operator 46 to close the contact 41 which energizes a relay 43 to close a reversing circuit to the prime mover 21, to drive the lead screw 15 in a direction to lift the carriage C and reservoir R. This action causes lowering of fluid F in the reservoir R until the operator 46 opens the contact 41 to stop the prime mover 21.

From the foregoing, it will be apparent that the controlling means S that I provide energizes the prime mover 21 in a manner to govern elevation of the carriage C by the means D so that the vertical position of the reservoir R is determined by the vertical position of the vessel V. In order to provide for sensitive operation of the controlling means S I employ very light voltage and current in connection with the circuits 40' and 41' from the two contacts, respectively, which build up the signals necessary to properly operate the relays 42 and 43. Further, in order to protect the mechanism from over-travel, I provide limit switches 44 and 45 that open the circuit to the prime mover 21, at the top and bottom of the guide B (see FIG. 5).

In order to determine the height of the feeler P that is engaged with the object to be measured, an appropriate scale could be related to the guide B and carriage C, in which case it would be necessary to associate or correlate the fluid level with the placement of the scale and with the position of the feeler tip. In order to eliminate the necessity of accurate relationship of parts, and in accordance with the invention, I provide the counter K which is simply and reliably associated with the lead screw 15 and which exactly indicates the vertical position of the feeler P. In carrying out the present invention it is necessary to employ an exact and accurate lead screw 15, commensurate with the accuracy desired, and in practice I employ a V threaded screw having forty threads per inch. Further, the gear reduction box 23 of the elevating means D is geared, in practice, to reduce the speed of the prime mover 21 twenty-five to one, to the end that one thousandth of an inch is represented by one revolution of the prime mover drive shaft 22. It is to be understood that the number of threads per inch and the said gear reduction can be varied as desired.

The position indicator K involves, generally, a counter unit 50, a transmitter 51 and a receiver 52. The counter unit 50 is shown carried by the probe unit Y, the transmitter 51 is coupled to the elevating means D and the receiver 52 is connected with the transmitter and is coupled to the counter unit 50. With the elements related in the manner thus far described, the counter unit indicates the advancement and retraction of the lead screw 15 and consequently indicates the height of the carriage C. In the particular case illustrated each revolution at the counter 50 indicates one thousandths travel of the carriage, upward or downward as the case may be.

Any suitable counter unit 50 may be employed, that adds and subtracts numbers and which is adapted to display a sum from the numbers one to ten, or any multiple thereof. For purposes of illustration, I have indicated a counter unit 50 having four counting drums 55, one for single digitals, one for tens, one for hundreds and one for thousands. Further, in order to facilitate use of the apparatus that I provide, a cancellation means 56 is provided in connection with the counter unit 50 so that the drums 55 can be turned in unison to a "Zero" position, said "Zero" position representing a starting point, or base line, or horizontal reference plane. Also, since the counter unit 50 is employed to respond to rotation of the lead screw 15, I prefer to employ a revolution counter 50 that operates through rotation of a shaft 57. Any suitable commercially available counter unit 50 may be employed, for example, a step operated device controlled by impulses whereby it is advanced or retracted, or any like counter unit.

When a revolution counter 50 is employed, the transmitter 51 and receiver 52 are adapted to handle rotative forces. That is, the transmitter 51 is adapted to respond to rotative force and the receiver 52 is adapted to deliver rotative force. In the particular case illustrated, the transmitter 51 and receiver 52 are electrically actuated elements, preferably synchronous motors, or Selsyn motors, that are coupled by electric conductors 53. I have shown the transmitter 51 and receiver 52 as like motors (see FIG. 7) excited by an alternating current power supply 54 through power lines 54'. When the field windings of the Selsyn motors are energized the receiver 52 follows the rotative position of the transmitter 51, to the end that one revolution imposed upon the transmitter 51 by turning of the shaft 22 results in one revolution of the receiver 52 and turning of the shaft 57.

From the foregoing, it will be understood how each of the elements of the height indicating apparatus functions. In order to employ the apparatus, it is merely necessary to level the base through the jacks 11 as indicated by the spirit level 10. Also, an electric power supply 60 is connected to the motor controlling circuits through a switch 61. With the switch 61 closed, the prime mover 21 is operated, as governed by the level of fluid F in the reservoir R actuating the contacts 40 and 41, to elevate the carriage C either upwardly or downwardly, depending upon the elevation of the probe unit Y. With the base A leveled in a true horizontal plane, the carriage C is reciprocated in exact vertical alignment; however, it is to be understood that there may be special cases requiring reciprocation of the carriage C along a predetermined incline. Assuming that the probe unit Y is manipulated to a position where it is engaged with an object to be measured, the carriage C will be operated to a height identical to the height of the probe unit Y. Since it will be necessary to compare the height of the object with a base line or horizontal reference plane, the probe unit Y is also manipulated to a position where it is engaged with some object representing said reference plane, or to any random point to be established as such. When the probe unit Y is at said horizontal reference plane the cancellation means 56 is operated to reduce the counter K to a "Zero" reading, from which any height, above or below the horizontal reference plane, may be related. It will be apparent that a suitable horizontal reference plane may be quickly established and accurately related to any primary or secondary object. That is, any primary or known object may be utilized to establish proper location of said reference plane, after which measurements can be made to related secondary objects.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A height indicating apparatus of the character described including, an operating unit with a vertically shiftable carriage and means elevating said carriage, a probe unit with a feeler adapted to engage with an object to be measured for height, a coupler joining the two units, means actuated by the coupler and controlling operation of the elevating means to shift the carriage in response to positioning of the probe unit, and a position indicator adapted to indicate the elevation of the carriage.

2. A height indicating apparatus of the character described including, an operating unit with a vertically shiftable carriage and means elevating said carriage, a probe unit with a feeler adapted to engage with an object to be measured for height, a coupler joining the two units, means actuated by the coupler and controlling operation of the elevating means to shift the carriage in response to positioning of the probe unit, and a position indicator with a transmitter coupled to the elevating means and a receiver connected with the transmitter and responsive to operation of the elevating means to indicate the elevation of the carriage.

3. A height indicating apparatus of the character described including, an operating unit with a vertically shiftable carriage and means elevating said carriage, a probe unit with a feeler adapted to engage with an object to be measured for height, a coupler joining the two units, means actuated by the coupler and controlling operation of the elevating means to shift the carriage in response to positioning of the probe unit, and a position indicator with a transmitter coupled to the elevating means and a receiver connected with the transmitter and responsive to operation of the elevating means and having indicia to indicate the elevation of the carriage, and having cancellation means to operate said indicia to a "Zero" position.

4. A height indicating apparatus of the character described including, an operating unit with a vertically disposed guide and with a vertically shiftable carriage directed by the guide and with a lead screw operated by a prime mover for elevating the carriage, a probe unit with a feeler adapted to engage with an object to be measured for height, a coupler joining the two units, means actuated by the coupler and controlling operation of the prime mover to shift the carriage in response to positioning of the probe unit, and a position indicator with a transmitter coupled to the prime mover and a receiver connected with the transmitter and responsive to operation of the prime mover to indicate the elevation of the carriage.

5. A height indicating apparatus of the character described including, an operating unit with a vertically disposed guide and with a vertically shiftable carriage directed by the guide and with a lead screw operated by a prime mover for elevating the carriage, a probe unit with a feeler adapted to engage with an object to be measured for height, a coupler joining the two units, means actuated by the coupler and controlling operation of the prime mover to shift the carriage in response to positioning of the probe unit, and a position indicator involving a synchronous transmitter motor coupled to the prime mover and a synchronous receiver motor connected with the transmitter motor and responsive to operation of the prime mover to indicate the elevation of the carriage.

6. A height indicating apparatus of the character described including, an operating unit with a vertically disposed guide and with a vertically shiftable carriage directed by the guide and with a lead screw operated by a prime mover for elevating the carriage, a probe unit with a feeler adapted to engage with an object to be measured for height, a coupler joining the two units, means actuated by the coupler and controlling operation of the prime mover to shift the carriage in response to positioning of the probe unit, and a position indicator involving a synchronous transmitter motor coupled to the prime mover, a synchronous receiver motor connected with the transmitter motor and responsive to operation of the prime mover and a counter coupled to the receiver motor to indicate the elevation of the carriage.

7. A height indicating apparatus of the character described including, an operating unit with a vertically disposed guide and with a vertically shiftable carriage directed by the guide and with a lead screw operated by a motor for elevating said carriage, a probe unit with a feeler adapted to engage with an object to be measured for height, a coupler including a reservoir carried by the carriage, a vessel carried by the probe unit and a fluid conducting element joining the same, electrical contact means actuated by the level of fluid in the reservoir and controlling operation of the motor to shift the carriage in response to positioning of the probe unit, and a position indicator adapted to indicate the elevation of the carriage.

8. A height indicating apparatus of the character described including an operating unit with a vertically disposed guide and with a vertically shiftable carriage directed by the guide and with a lead screw operated by a motor for elevating said carriage, a probe unit with a feeler adapted to engage with an object to be measured for height, a coupler including a reservoir carried by the carriage, a vessel carried by the probe unit and a fluid conducting element joining the same, electrical contact means actuated by the level of fluid in the reservoir and controlling operation of the motor to shift the carriage in response to positioning of the probe unit, and a position indicator including a synchronous transmitter motor coupled to the motor and a synchronous receiver motor connected with the transmitter motor and responsive to operation of the motor to indicate the elevation of the carriage.

References Cited in the file of this patent

UNITED STATES PATENTS

| | | |
|---|---|---|
| 1,970,883 | Bryant | Aug. 21, 1934 |
| 2,648,912 | Osgood | Aug. 18, 1953 |
| 2,814,127 | Blatchford | Nov. 26, 1957 |
| 2,838,844 | Sackett | June 17, 1958 |

FOREIGN PATENTS

| | | |
|---|---|---|
| 492,587 | France | Mar. 27, 1919 |